US009915676B2

(12) United States Patent
Park

(10) Patent No.: US 9,915,676 B2
(45) Date of Patent: Mar. 13, 2018

(54) METHOD FOR RECEIVING SOUND OF SUBJECT AND ELECTRONIC DEVICE IMPLEMENTING THE SAME

(71) Applicant: Samsung Electronics Co., Ltd., Suwon-si, Gyeonggi-do (KR)

(72) Inventor: Seongwoong Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 14/806,097

(22) Filed: Jul. 22, 2015

(65) Prior Publication Data

US 2016/0044220 A1    Feb. 11, 2016

(30) Foreign Application Priority Data

Aug. 6, 2014   (KR) .................. 10-2014-0101139

(51) Int. Cl.
| | | |
|---|---|---|
| *H04N 5/225* | (2006.01) | |
| *H04N 5/76* | (2006.01) | |
| *G01P 3/38* | (2006.01) | |
| *H04R 1/40* | (2006.01) | |
| *H04R 3/00* | (2006.01) | |
| *G06T 7/246* | (2017.01) | |

(52) U.S. Cl.
CPC .............. *G01P 3/38* (2013.01); *G06T 7/248* (2017.01); *H04R 1/406* (2013.01); *H04R 3/005* (2013.01); *G06T 2207/30196* (2013.01); *H04R 2499/11* (2013.01)

(58) Field of Classification Search
CPC ........... G11B 2020/10537; G11B 2020/10546; G11B 2020/10555; G11B 2020/10564; G11B 2020/10574; G11B 2020/10583; G11B 2020/10601; G06F 17/30787; G06F 3/16; H04N 1/00119; H04N 21/233; H04N 21/2335; H04N 21/439; H04N 21/2368; G03B 31/00; G03B 31/06; G03B 31/08; G10K 2210/1051; H04R 2499/11
USPC ...................................... 348/169–173, 231.4
See application file for complete search history.

(56) References Cited

U.S. PATENT DOCUMENTS

| | | | |
|---|---|---|---|
| 2010/0034397 A1* | 2/2010 | Nakadai ...................... | B25J 5/00 381/58 |
| 2012/0098983 A1* | 4/2012 | Ojala ...................... | G03B 31/00 348/211.99 |
| 2012/0310093 A1* | 12/2012 | Tanabe ...................... | A61B 8/54 600/443 |
| 2013/0127994 A1* | 5/2013 | Mihelich ................ | H04N 19/20 348/46 |
| 2014/0049595 A1* | 2/2014 | Feng ........................ | H04N 7/15 348/14.08 |
| 2014/0079242 A1* | 3/2014 | Nguyen ................... | H04R 5/00 381/86 |

(Continued)

*Primary Examiner* — Chia-Wei A Chen
(74) *Attorney, Agent, or Firm* — Jefferson IP Law, LLP

(57) ABSTRACT

A method for receiving a sound generated from a moving subject and an electronic device implementing the same are provided. The method includes confirming a position of a subject so as to intensively receive a sound generated from the subject, photographing a moving image, selecting at least one subject among subjects included in the photographed moving image, obtaining movement information of the selected subject, and adjusting a major sound capture region based on the obtained movement information of the subject.

17 Claims, 12 Drawing Sheets

(56) References Cited

U.S. PATENT DOCUMENTS

| | | | |
|---|---|---|---|
| 2015/0016641 A1* | 1/2015 | Ugur | G10L 21/0216 381/303 |
| 2015/0049168 A1* | 2/2015 | Dielacher | G06K 9/00805 348/46 |
| 2015/0054943 A1* | 2/2015 | Zad Issa | H04R 3/005 348/135 |
| 2015/0057779 A1* | 2/2015 | Saungsomboon | G06F 3/16 700/94 |
| 2015/0331490 A1* | 11/2015 | Yamada | G06F 3/017 345/156 |
| 2015/0362909 A1* | 12/2015 | McReynolds | G06Q 10/04 700/275 |
| 2016/0066119 A1* | 3/2016 | Wu | H04S 7/30 381/303 |
| 2016/0239252 A1* | 8/2016 | Nakagawa | G06F 3/012 |

* cited by examiner

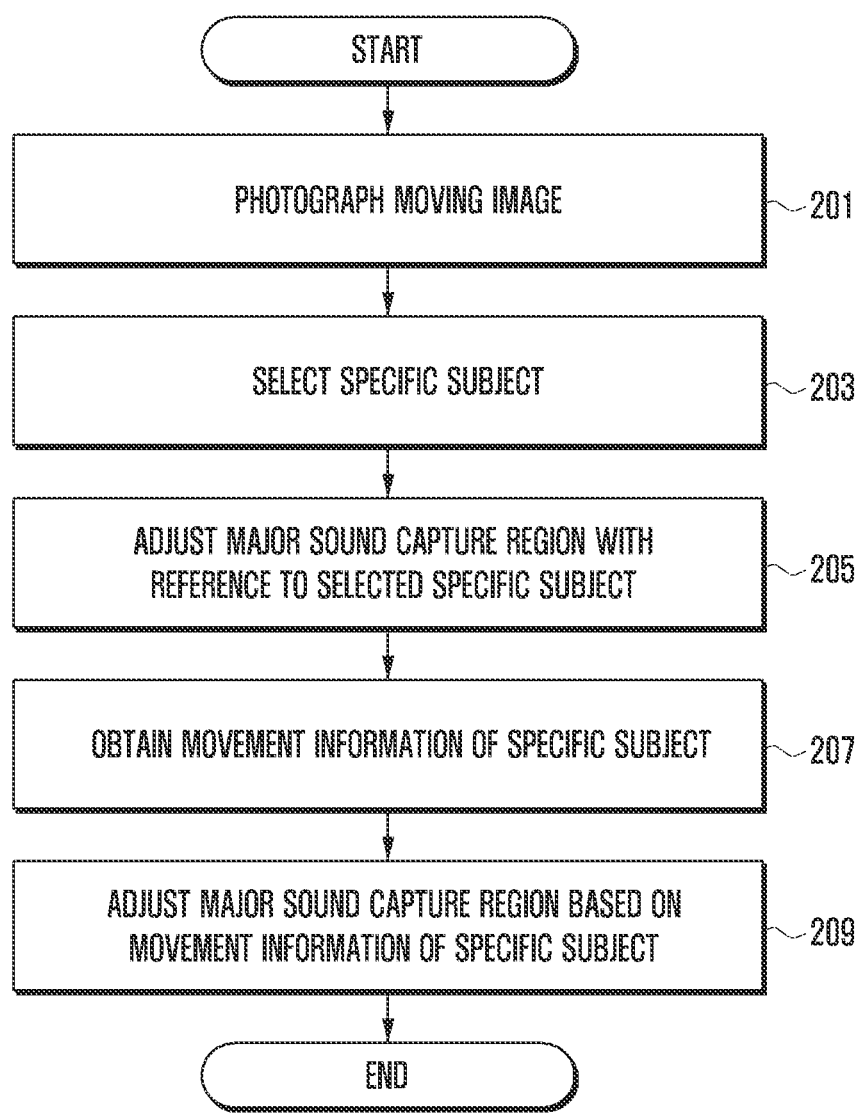

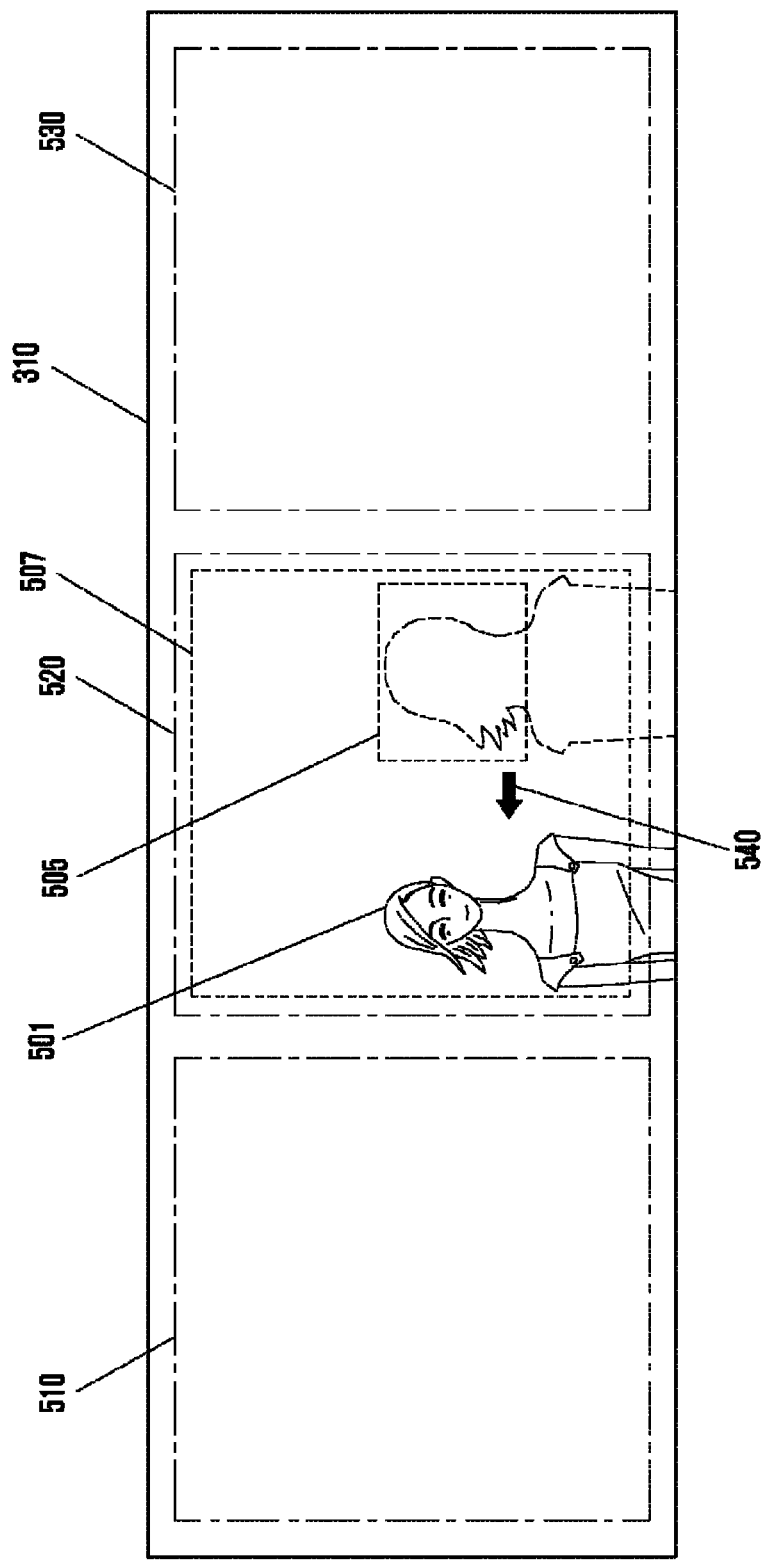

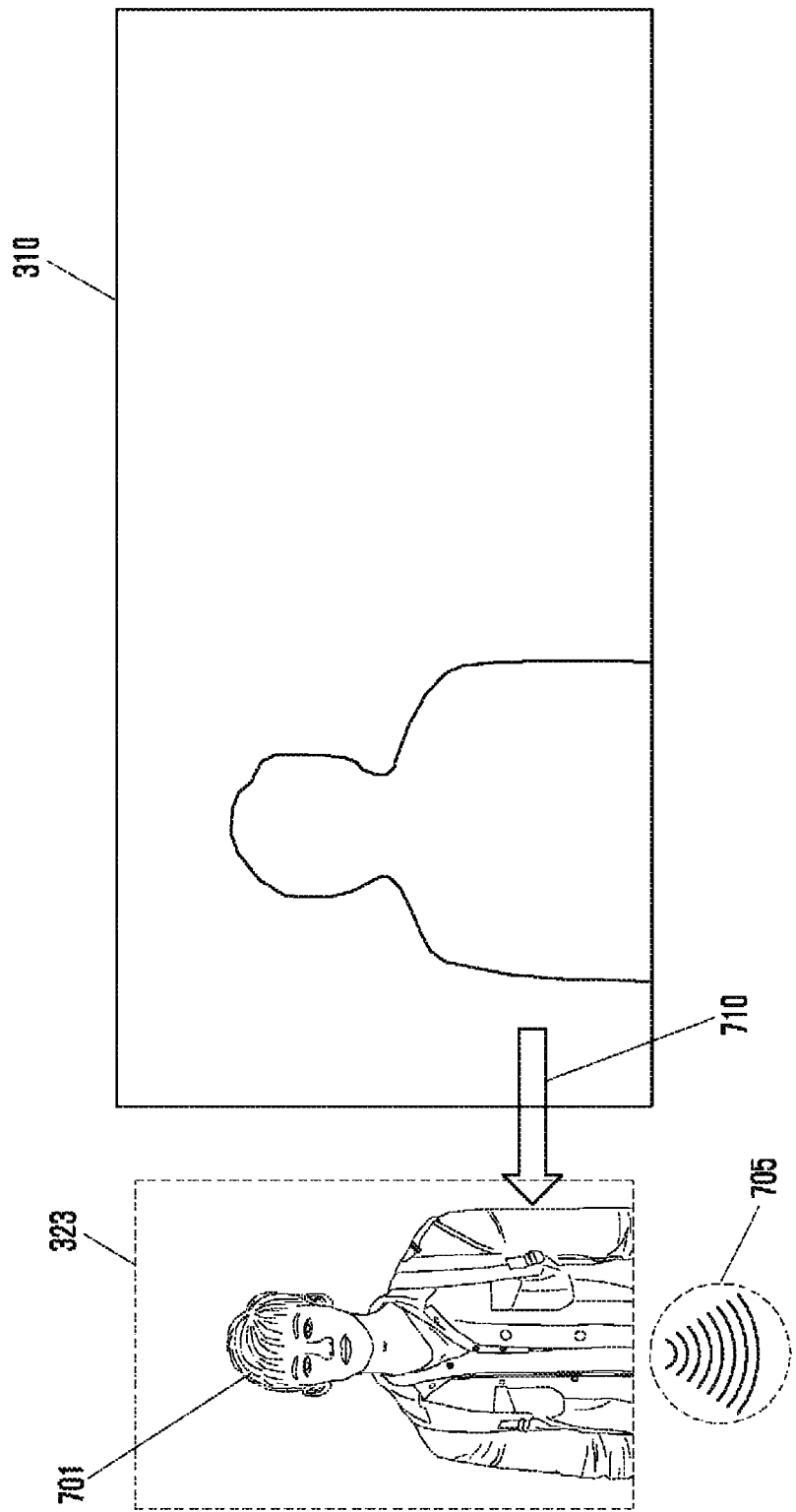

METHOD FOR RECEIVING SOUND OF SUBJECT AND ELECTRONIC DEVICE IMPLEMENTING THE SAME

CROSS-REFERENCE TO RELATED APPLICATION(S)

This application claims the benefit under 35 U.S.C. § 119(a) of a Korean patent application filed on Aug. 6, 2014 in the Korean Intellectual Property Office and assigned Serial number 10-2014-0101139, the entire disclosure of which is hereby incorporated by reference.

TECHNICAL FIELD

The present disclosure relates to a method of intensively receiving a sound generated from a moving subject and an electronic device implementing the same.

BACKGROUND

Recently, the utilization of an electronic device provided with a camera has been gradually grown. With the advancement of the performance of the camera provided in the electronic device, the electronic device is capable of photographing a high-resolution moving image. In addition, the electronic device is capable of taking photographs focusing on a specific subject (e.g., a specific object) like a high-performance camera (e.g., a digital single-lens reflex (DSLR) camera). Since a user focuses on a subject to be photographed, the electronic device is capable of photographing a scene desired by the user. The user may operate a control option of the camera so as to enlarge or reduce an image about the subject to be photographed.

When photographing a moving image, the electronic device may receive sound together with the image. In general, when photographing the moving image, the electronic device receives not only the sound generated from the subject but also surrounding sound and noise. For example, the electronic device also simultaneously receives the sound that the user does not want to receive.

An electronic device may set a certain portion of an entire photographing range as a major sound capture region (e.g., a region in which the electronic device is capable of receiving sound more intensively), and may intensively receive the sound generated from a certain region set as the major sound capture region as compared with other regions. The electronic device may intensively receive the sound generated from a specific region using a directional microphone. For example, the electronic device may be configured to intensively receive sound heard from the left side of the electronic device or to intensively receive sound heard from the right side of the electronic device. An electronic device according to the related art may be configured such that a user directly sets a specific direction, and the electronic device intensively receives sound (e.g., sound capture) generated from the specific direction. For example, the electronic device may be configured to more intensively receive sound generated from a specific direction with reference to the electronic device, for example, from the upper side, lower side, left side or right side of an angle of view (e.g., a photographing range).

The present disclosure proposes a method and an electronic device of recognizing a specific subject which is being photographed as a moving image, capturing movement information of the specific subject, and changing a major sound capture region based on the captured movement information to be capable of intensively receiving sound generated from the specific subject. The electronic device is capable of adjusting the major sound capture region depending on the position of the specific subject so as to minimize surrounding noise and to intensively receive the sound generated from the specific subject.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for receiving a sound of a subject and an electronic device for implementing the same to recognize a subject included in a moving image when photographing the moving image, and to receive the sound generated from the recognized subject more intensively.

In accordance with an aspect of the present disclosure, a method of receiving a sound of a subject is provided. The method includes photographing a moving image, selecting at least one subject among subjects included in the photographed moving image, obtaining movement information of the at least one selected subject, and adjusting a major sound capture region based on the obtained movement information of the at least one subject.

In accordance with another aspect of the present disclosure, an electronic device for receiving a sound of a subject is provided. The electronic device includes a camera configured to photograph a moving image, a microphone configured to receive a sound, a display unit configured to display a moving image photographed by the camera, and a control unit configured to control the camera to photograph the moving image, to select a subject included in the photographed moving image, to obtain movement information of the selected subject, and to control the microphone based on the obtained movement information of the subject to adjust a major sound capture region.

According to various embodiments of the present disclosure, a method and an electronic device for receiving a sound of a subject may recognize at least one subject among subjects included in a moving image when photographing the moving image. In addition, the position of the subject may be confirmed by obtaining movement information of the at least one recognized subject (e.g., a specific subject). The electronic device may intensively receive the sound generated from the specific subject by adjusting a major sound capture region according to the confirmed position of the specific subject. According to various embodiments of the present disclosure, the method and the electronic device may control the directional microphones so as to filter noise and relatively less important sounds generated from surroundings and to intensively receive the sound generated from the specific subject. In addition, even in the case where the specific subject moves in a speed equal to or greater than the threshold, the electronic device may adjust the major sound capture region so as to intensively receive the sound generated from the specific subject.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a flowchart illustrating a method of adjusting a major sound capture region based on movement information of a subject according to an embodiment of the present disclosure;

FIGS. 5A, 5B, and 5C are views illustrated based on a method of adjusting a major sound capture region in a case where a subject moves at a speed equal to or greater than a threshold according to various embodiments of the present disclosure;

FIGS. 7A and 7B are views illustrated based on a method of adjusting a major sound capture region in a case where a subject moves out of a photographing range according to various embodiments of the present disclosure.

Throughout the drawings, it should be noted that like reference numbers are used to depict the same or similar elements, features, and structures.

DETAILED DESCRIPTION

Figure 1:
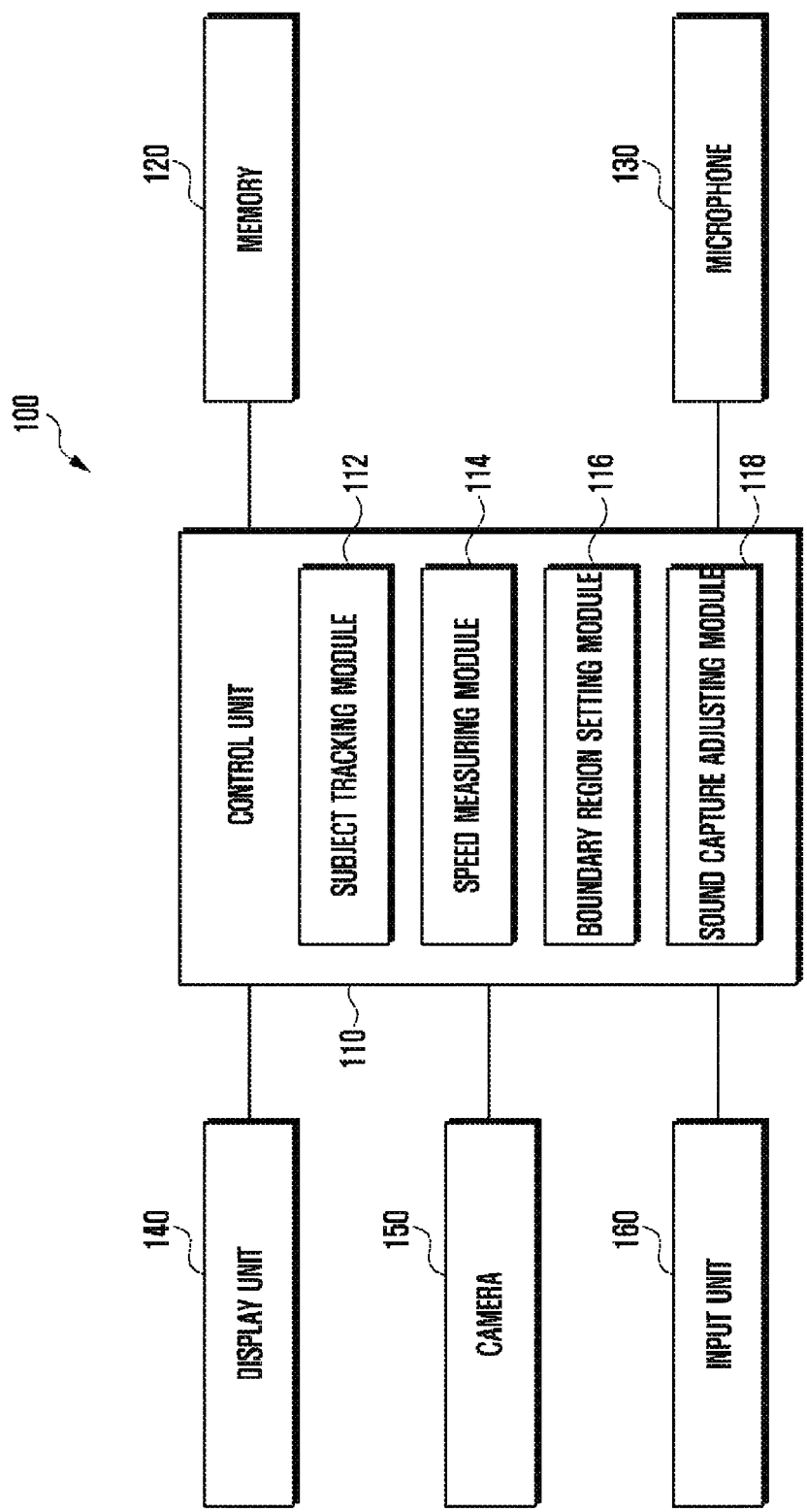
FIG. 1 illustrates a block diagram of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The suffixes "module" and "unit" as used for elements in various embodiments are assigned only for ease of description, and they do not have distinguishing meanings or roles. Accordingly, it should be noted that the suffixes "module" and "unit" may be interchangeably used.

The term "include" or "may include" refers to the existence of a corresponding disclosed function, operation or component which can be used in various embodiments of the present disclosure and does not limit one or more additional functions, operations, or components. In the present disclosure, the terms such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

The term "or" as used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first component element may be named a second component element. Similarly, the second component element also may be named the first component element.

As used herein, terms are used merely for describing specific embodiments and are not intended to limit the present disclosure.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a moving picture experts group (MPEG-1 or MPEG-2) audio layer III (MP3) player, a mobile medical appliance, a camera, and a wearable device (e.g., a head-mounted-device (HMD), such as electronic glasses, electronic clothes, an electronic bracelet, an electronic necklace, an electronic appcessory, electronic tattoos, a smartwatch, and the like).

Hereinafter, an electronic device according to various embodiments of the present disclosure will be described with reference to the accompanying drawings. In various embodiments of the present disclosure, the term "user" may indicate a person using an electronic device or a device (e.g., an artificial intelligence electronic device) using an electronic device.

FIG. 1 illustrates a block diagram of an electronic device according to various embodiments of the present disclosure.

Referring to FIG. 1, an electronic device 100 may include a control unit 110, a memory 120, a microphone 130, a display unit 140, a camera 150, and an input unit 160.

The aforementioned respective components are connected with each other by a bus, and the control unit 110 may transmit a signal (e.g., a control message) to each of the components so as to control each of the components.

The control unit 110 may typically control the overall operations of the electronic device 100. For example, the control unit 110 may receive a command from each of the aforementioned other components (e.g., memory 120, microphone 130, display unit 140, camera 150, and input unit 160) through the bus, decode the received command, and execute arithmetic or data processing according to the decoded command. According to various embodiments of the present disclosure, the electronic device may recognize the subject, and adjust a sound capture region based on the movement information of the subject. Accordingly, the control unit 110 may include a subject tracking module 112, a speed measuring module 114, a boundary region setting module 116, and a sound capture region adjusting module 118.

The subject tracking module 112 may track at least one subject among the subjects photographed by the electronic device 100. For example, among the subjects photographed as a moving image, the subject tracking module 112 may recognize the at least one subject as a specific subject. Here, the specific subject may be selected to correspond to a user input, or the subject positioned at the center of the moving image may be arbitrarily selected. In addition, the subject tracking module 112 may collect specific subject information in connection with the selected specific subject. For example, the subject tracking module 112 may collect specific subject information, such as the shape, type, color, and brightness of the specific subject. Thereafter, the collected specific subject information may be stored in the memory 120 by the control unit 110. The subject tracking module 112 may continuously track the specific subject based on the collected specific subject information. For example, the subject tracking module 112 may obtain the movement information of the specific subject (e.g., the moving direction and position of the subject) based on the collected specific subject information (the shape, type, color, and brightness of the specific subject). Thereafter, the subject tracking module 112 may confirm the position of the specific subject based on the movement information of the specific subject and continuously track the specific subject. When the specific subject is a human, the subject tracking module 112 may confirm the face of the human using a face recognition technique, and continuously track the corresponding human.

For example, the subject tracking module 112 may track the specific subject using an OPEN source Computer Vision library (OPEN CV) under the control of the control unit 110. The OPEN CV is a real time computer image program library that may be used in an application program of, e.g., object, face, action recognition, lip-reading, motion tracking, and the like. The OPEN CV is an open source library including algorithms optimized for analyzing a lot of images. In addition, the subject tracking module 112 may set a region of interest (ROI) that enables the background and the subject to be differentiated from each other in the moving image, under the control of the subject control unit 110. For example, the subject tracking module 112 may set a region of a part of the photographing range capable of photographing the moving image as the ROI. In addition, the subject tracking module 112 may activate an ROI including the specific subject in the pre-set ROI so as to detect the specific subject. In this way, the subject tracking module 112 may recognize at least one subject among the subjects, which are being photographed as a moving image, as a specific subject, and continuously track the specific subject.

The speed measuring module 114 may measure the speed of the specific subject tracked using the subject tracking module 112. The speed measuring module 114 may measure the moving speed of the specific subject based on the movement information of the specific subject which has been collected by the subject tracking module 112. For example, the movement information of the specific subject includes various information items capable of measuring the moving direction and the moving speed of the specific subject. In addition, the movement information of the specific subject may be stored in the memory 120. The speed measuring module 114 may measure the moving speed of the specific subject based on the movement information of the specific subject which is stored in the memory 120.

The boundary region setting module 116 may divide the photographing range (e.g., an angle of view), which is being photographed as a moving image, into a plurality of boundary regions. The photographing range is a range displayed on the display unit 140 of the electronic device 100 and may be an angle of view of the camera 150. The boundary region setting module 116 may set a boundary line with reference to the photographing range, and divide the photographing range into a plurality of boundary regions (e.g., a first boundary region, a second boundary region, and a third boundary region) using the boundary line as a boundary. Here, the boundary line may be differently set depending on the distance between the specific subject and the electronic device 100. For example, in the case where the distance between the specific subject and the electronic device 100 is a short-distance, the specific subject may occupy a great part of the angle of view of the camera 150. In this case, the boundary region setting module 116 may adjust the position of the boundary line according to a ratio occupied by the specific subject in the view of angle of the camera 150. For example, in the case where the angle of view are divided into three (e.g., left-hand, central, and right-hand) boundary regions by two boundary lines and the specific subject is photographed to be larger than the central boundary region, the spacing of the two boundary lines may be widened. Alternatively, in the case where the distance between the specific subject and the electronic device 100 is a long-distance, the specific subject may occupy a part of the angle of view of the camera 150. In this case, the boundary region setting module 116 may adjust the positions of the boundary lines to correspond to the position of the specific subject. Here, the short-distance and the long-distance may be differentiated from each other with reference to a specific value set in advance by a developer. When the boundary region is divided into three (e.g., left-hand, central, right-hand) boundary regions with reference to the angle of view, the three boundary regions may have the same area or different areas. Here, the boundary region setting module 116 may differentiate each of the boundary regions using the boundary lines as the boundary. The positions and number of the boundary lines may be determined based on the photographing range. For example, a boundary line may be set at every defined distance by determining a position between the subject and the electronic device. The number of the boundary lines is not limited to two and may be less or more than two. The developer may divide the boundary regions in advance, and a user may arbitrarily divide the boundary regions according to the user setting.

The sound capture region adjusting module 118 may adjust (change) the major sound capture region. The major sound capture region may be a region set such that the control unit 110 may control the microphone 130 so as to intensively receive a desired sound. For example, the sound capture region adjusting module 118 may more intensively receive a sound generated in a certain range of the photographing range using a directional microphone. In the case where the sound generated from a subject positioned at the left side with reference to the electronic device 100 and the sound is received, the sound capture region adjusting module 118 may set the volume of the microphone 130 embedded on the left of the electronic device 100 to be louder. Setting the volume of the microphone 130 to be louder indicates that more sounds may be received as louder sounds as compared with the case where the volume is set to be lower. The sound capture region adjusting module 118 may adjust the major sound capture region to correspond to the position and size of the specific subject. When a plurality of microphones are used, the sound capture region adjusting module 118 may more correctly differentiate surrounding noise and a sound desired to receive and intensively receive only the sound desired to receive. The sound capture region adjusting module 118 may confirm the position of the specific subject from the subject tracking module 112, the speed measuring module 114, and the boundary region setting module 116 as described above, and adjust the major sound capture region with reference to the specific subject. The major sound capture region refers to a sound capture region in which a sound may be more intensively received in a louder sound as compared with a sound generated from a region other than the major sound capture region.

For example, the sound capture region adjusting module 118 may confirm the position of the specific subject and adjust the major sound capture region, based on the movement information of the specific subject collected by the subject tracking module 112. In addition, the sound capture region adjusting module 118 may also adjust the major sound capture region depending on the moving speed of the specific subject measured by the speed measuring module 114. For example, in the case where the specific subject moves in a continuously tractable speed, the sound capture region adjusting module 118 may change the major sound capture region to correspond to the movement of the specific subject. In addition, the sound capture region adjusting module 118 may adjust the major sound capture region based on boundary regions set by the boundary region setting module 116. For example, when the specific subject moves in a speed equal to or greater than a threshold, the sound capture region adjusting module 118 may adjust the major sound capture region based on the boundary region where the specific subject is positioned, under the control of the control unit 110. The speed equal to or greater than the threshold may be a speed which makes it difficult for the sound capture region adjusting module 118 to continuously track the specific subject. Accordingly, when the moving speed of the specific subject exceeds the threshold, the sound capture region adjusting module 118 may adjust the major sound capture region based on the boundary regions, rather than adjusting the major sound capture region with reference to the specific subject.

In general, in order to capture the sound of a sound source (e.g., a subject or an object), a selective directionality between horizontal or vertical axis sound sources with reference to the user is required. For the selective directionality, the electronic device 100 may include a plurality of microphones arranged on the left, right, upper, and lower surfaces thereof. In addition, when two microphones are used, the microphones may be arranged either on the left and right surfaces or on the upper and lower surfaces of the electronic device 100 to be separated from each other. More particularly, the directionality may be implemented through signal processing, such as beam-forming, for the sounds captured through the plurality of microphones. Here, the beam-forming indicates forming sound beams to correspond to the sound capture region so as to make the beams have directionality. The major sound capture region may be a horizontal or vertical range formed by the angle of sound beams formed in the subject direction, i.e., by a sound capture angle.

For example, when the sound capture angle is increased, the major sound capture region is also widened so that the electronic device 100 can receive sound in a wide range. Whereas the sound capture angle is decreased, the major sound capture region is decreased so that the electronic device 100 can intensively capture sound generated in a narrow range. According to the present disclosure, the electronic device 100 may track the position of a subject through the subject tracking module 112, and adjust the beam-forming angle (e.g., sound capture angle) to correspond to the position of the subject through the sound capture region adjusting module 118. In addition, when the subject moves, the electronic device 100 may change the beam-forming angle to correspond to the subject. For example, the electronic device 100 may continuously change the beam-forming angle according to the movement of the subject, and intensively receive the sound generated from the subject.

The memory 120 may store commands or data received from the control unit 110 or the other components (e.g., the microphone 130, the display unit 140, the camera 150, or the input unit 160) or generated by the control unit 110 or the other components. Although not illustrated, the memory 120 may include an internal memory or an external memory. The internal memory may include at least one of, e.g., a volatile memory (e.g., a dynamic Random Access Memory (DRAM), a static RAM (SRAM), or a synchronous DRAM (SDRAM) and a non-volatile memory (e.g., a one time programmable Read Only Memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory). The internal memory may be a Solid State Drive (SSD). In addition, the external memory may further include a flash drive, for example, a compact flash (CF), a secure digital (SD), a Micro-SD, a Mini-SD, an extreme digital (xD), or a memory stick. The external memory may be functionally connected with the electronic device 100 through various interfaces. According to an embodiment of the present disclosure, the electronic device 100 may further include a storage device (or a storage medium), such as a hard drive.

The memory 120 may store data information required when the subject tracking module 112 tracks a specific subject. For example, the memory 120 may store a measurement value for recognizing the specific subject. In addition, the memory 120 may store a plurality of measurement values corresponding to the movement information of the specific subject. In addition, the memory 120 may store data information required for differentiating a boundary region through the boundary region setting module 116. For example, the control unit 110 may store, in the memory 120, data information required for receiving sounds by tracking a subject recognized using the subject tracking module 112, the speed measuring module 114, the boundary region setting module 116, and the sound capture region adjusting module 118.

The microphone 130 may also receive sounds generated from the surroundings. The microphone 130 may convert the received sounds into electrical signals. According to the present disclosure, the electronic device 100 may include at least two microphones 130 embedded therein, and the microphones 130 may be directional microphones. A directional microphone may be an elongated microphone capable of adjusting the sound capture angle so as to selectively receive sounds generated in a specific direction. The directional microphone may be unidirectional or bidirectional. A unidirectional microphone is capable of more intensively receiving sounds generated from one direction at 180 degrees. For reference, an omnidirectional microphone is capable of receiving all the sounds in every direction at 360 degrees regardless of a specific direction. The bidirectional microphone is capable of receiving sounds in two different directions, for example, from the front and rear sides, and weakly receiving sounds coming on in the other directions. At least two microphones 130 are capable of more intensively receiving sounds in a specific direction, under the control of the control unit 110. A method of selectively receiving sounds using at least two microphones 130 will be described with reference to FIG. 3A.

The display unit 140 may display various information items stored in the memory 120 (e.g., multimedia data or text data). The display unit 140 may include, for example, a panel, a hologram device, and a projector. In addition, the display unit 140 may further include a control circuit configured to control the panel, the hologram device, and the projector. According to the present disclosure, the display unit 140 may display an image photographed by the camera 150. The image displayed on the display unit 140 may be an image corresponding to the photographing range photographed through the camera 150. The display unit 140 may display a subject recognized as a specific subject in the image photographed through the camera 150 such that the subject is differentiated from the other subjects, under the control of the control unit 110.

The camera 150 may be a device capable of photographing a moving image and, although not illustrated, may include an image sensor (e.g., a front sensor or a rear sensor), a lens, an Image Signal Processor (ISP), or a flash (e.g., a Light Emitting Diode (LED) or xenon lamp).

The input unit 160 may include a touch panel, a (digital) pen sensor, a key, an ultrasonic input device, and the like. The input unit 160 may detect a touch input that is input to the input unit 160 through at least one of a capacitive method, a pressure-sensitive method, an infra-red method, and an ultrasonic method.

FIG. 2 is a flowchart illustrating a method for adjusting a major sound capture region based on movement information of a subject according to an embodiment of the present disclosure.

Referring to FIG. 2, in operation 201, the control unit 110 may photograph a moving image with the camera 150. The control unit 110 may also receive sounds generated from surroundings while photographing the moving image. The control unit 110 may simultaneously photograph a plurality of subjects, and receive sounds generated from the respective subjects and noise of the surroundings. The control unit 110 may receive sounds through the microphone 130 while displaying the moving image on the display unit 140.

In operation 203, the control unit 110 may select at least one subject as a specific subject from the subjects that are being photographed as the moving image through the subject tracking module 112. The specific subject may be selected by the control unit 110 to correspond to a user input, or a subject positioned at the center of the display unit 140 may be arbitrarily selected as the specific subject.

In operation 205, the control unit 110 may adjust the major sound capture region with reference to the selected specific subject. Here, the major sound capture region may be a region where the control unit 110 is capable of receiving sounds more intensively. The control unit 110 may adjust the major sound capture region through the sound capture region adjusting module 118, and increase or reduce the major sound capture region according to the user setting. In addition, the control unit 110 may adjust the major sound capture region to correspond to the distance between the specific subject and the electronic device 100. The major sound capture region is not limited to a specific shape. In addition, the display unit 140 may display the specific subject to be differentiated from the surrounding background so that the user may visually confirm the specific subject.

In operation 207, the control unit 110 may obtain the movement information of the selected specific subject. The control unit 110 may collect information of the specific subject (e.g., the shape, type, color, and brightness of the specific subject) in connection with the specific subject selected through the subject tracking module 112. In addition, the control unit 110 may obtain the movement information of the specific subject based on the collected information of the specific subject. The control unit 110 may obtain the movement information of the specific subject according to the change of the information of the specific subject (e.g., the shape, type, color, and brightness of the specific subject). Specifically, the control unit 110 compares the change amount of the movement information for a certain period of time to confirm the moving direction of the specific subject. For example, the movement information of the specific subject may include the information related to the moving direction of the specific subject.

In operation 209, the control unit 110 may adjust the major sound capture region based on the movement information of the specific subject. For example, when the specific subject moves from the right to the left with reference to the image displayed on the display unit 140, the control unit 110 may also move the major sound capture region, which has been adjusted with reference to the specific subject, from the right to the left. For example, the control unit 110 may track the specific subject and control the microphone 130 such that the major sound capture region may be adjusted according to the movement of the specific subject. Controlling the microphone 130 may mean that the beam-forming angle of a directional microphone is adjusted.

Figure 3A:
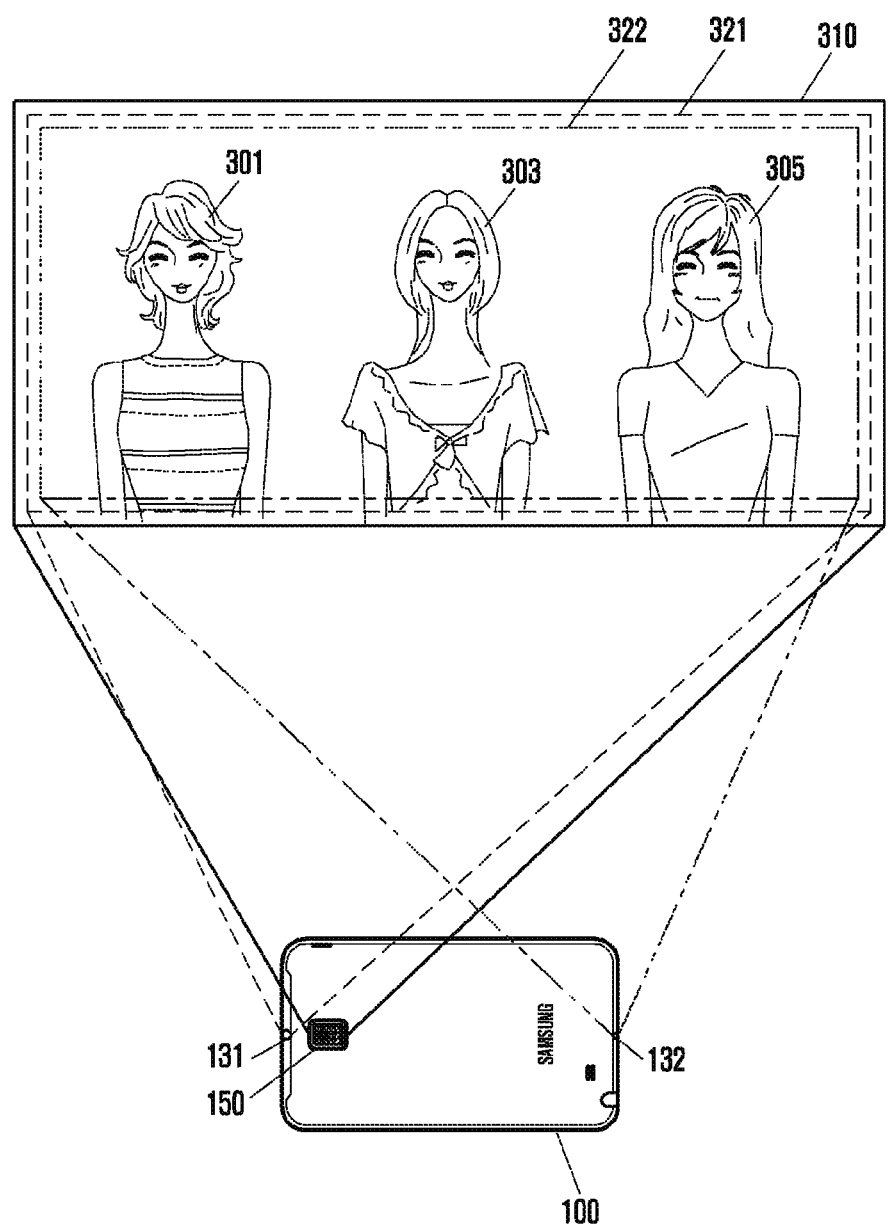
FIGS. 3A, 3B, and 3C are views illustrated based on a method of adjusting a major sound capture region based on movement information of a subject according to various embodiments of the present disclosure.
Figure 3B:
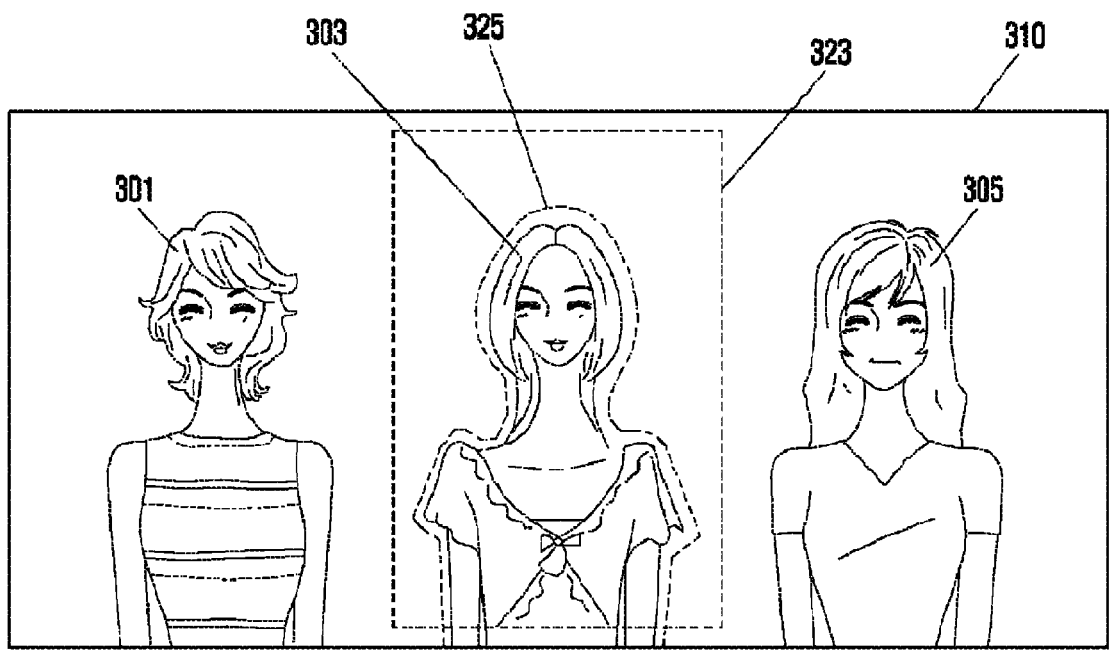
Figure 3C:
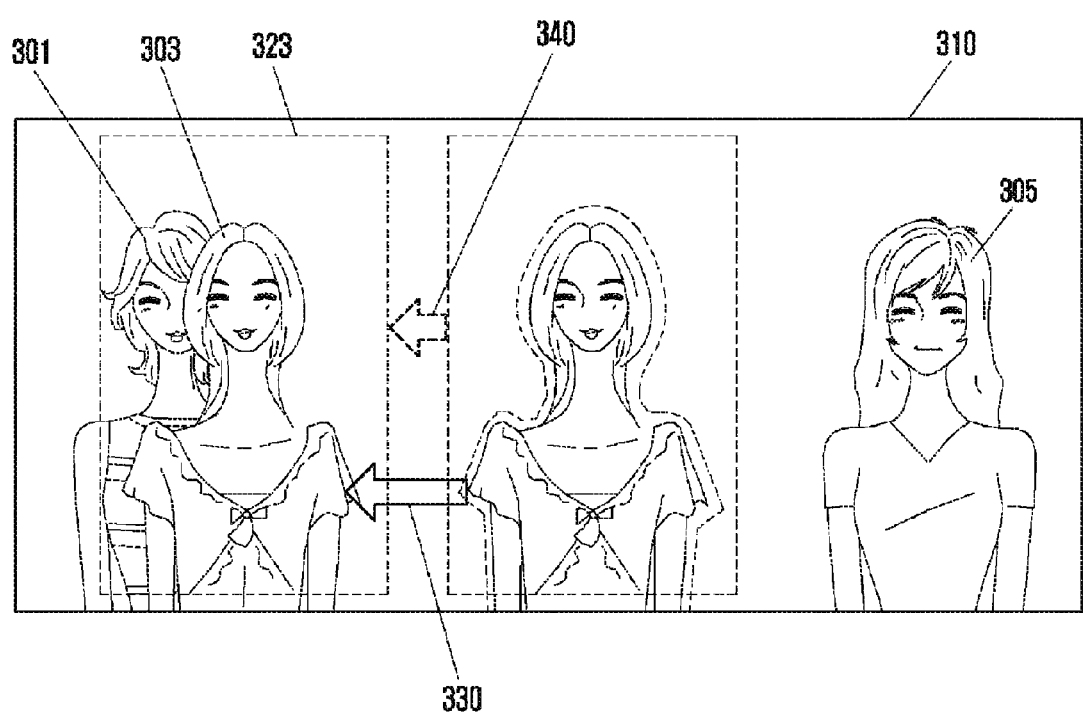

FIGS. 3A, 3B, and 3C are views illustrated based on a method of adjusting a major sound capture region based on movement information of a subject according to an embodiment of the present disclosure.

FIG. 3A may be a view corresponding to operation 201 of FIG. 2.

Referring to FIG. 3A, the electronic device 100, in particular, the control unit 110 may photograph subjects (e.g., a first subject 301, a second subject 303, and a third subject 305). Here, the subjects may be humans or objects as a photographing target. The display unit 140 may display an image received through the camera 150 under the control of the control unit 110. The image displayed on the display unit 140 may just correspond to a photographing range 310 photographed by the camera 150. The control unit 110 may photograph the subjects (the first subject 301, the second subject 303, and the third subject 305) included in the photographing range 310 through the camera 150. The control unit 110 may receive sounds through the microphones (a first microphone 131 and a second microphone 132) while photographing a moving image. The control unit 110 may control the microphones (the first microphone 131 and the second microphone 132) so as to adjust the major sound capture region.

For example, the control unit 110 may adjust the sound capture region of the first microphone 131 to a first sound capture region 321 with reference to the photographing range 310. In addition, the control unit 110 may adjust the sound capture region of the second microphone 132 to a second sound capture region 322 with reference to photographing range 310. Thereafter, the region where the first sound capture region 321 and the second sound capture region 322 overlap with each other may be a major sound capture region. The major sound capture region may be a certain range in the photographing range where sounds are intensively received through the microphones.

While FIG. 3A illustrates each of the sound capture regions (e.g., first sound capture region 321 and second sound capture region 322) as a photographing range, the sound capture regions are not limited thereto. The control unit 110 controls the microphones by software so as to reduce the size of the major sound capture regions. According to the present disclosure, the electronic device may adjust the major sound capture region more finely using a plurality of microphones, and receive the sounds generated from the adjusted major sound capture region more intensively. For example, the sound capture region where the first sound capture region 321 of the first microphone 131 and the second sound capture region 322 of the second microphone 132 are overlapped with each other, may be set as the major sound capture region. When three of more microphones are employed, the sound capture region where the respective microphones overlap with each other may be set as the major sound capture region. As the number of microphones increases, the sounds generated from the major sound capture region may be received to be more clearly differentiated from surrounding sounds. The at least two microphones may be arranged to be symmetrical to each other on the electronic device 100 at the left and right sides or the upper and lower sides of the electronic device 100.

FIG. 3B may be a view corresponding to operations 203 and 205 of FIG. 2.

Referring to FIG. 3B, the control unit 110 may recognize the second subject 303 among the subjects (the first subject 301, the second subject 303, and the third subject 305) include in the photographing range 310. The control unit 110 may select the second subject 303 to correspond to the user input, or select the second subject 303 positioned at the center of the photographing range 310 so as to recognize the second subject 303 as a specific subject. In addition, the control unit 110 may obtain information of the subject 303, such as the shape, type, color, and brightness of the subject 303 through the subject tracking module 112, and track the second subject 303 based on the subject information. When the second subject 303 is a human, the control unit 110 may recognize the face of the second subject 303, and track the second subject 303. The control unit 110 may recognize the face of the second subject 303 using an OPEN CV. After recognizing the second subject 303 as the specific subject, the control unit 110 may adjust a major sound capture region 323 based on the recognized second subject 303. Here, the major sound capture region 323 may be a sound capture region in which the first sound capture region 321 and the second sound capture region 322 overlap with each other. At this time, the control unit 110 may adjust a part of the photographing range 310 to the major sound capture region 323 through the sound capture setting module 118. The control unit 110 may display a type 325 of the recognized second subject 303 so that the user may visually confirm the recognized second subject 303. The control unit 110 may adjust the major sound capture region 323 with reference to the second subject 303, and differently adjust the major sound capture region 323 according to, for example, the position and size of the subject. For example, the control unit 110 may confirm the size and type of the second subject 303 through the subject tracking module 112, and adjust the size of the major sound capture region 323 to be increased or decreased to correspond to the second subject 303.

FIG. 3C may be a view corresponding to operations 207 and 209 of FIG. 2.

Referring to FIG. 3C, the control unit 110 may track the second subject 303 through the subject tracking module 112. Thereafter, the control unit 110 may also move the major sound capture region 323 (arrow 340) to correspond to the movement of the second subject 303 (arrow 330) together with the movement of the second subject 303. For example, the control unit 110 may recognize the second subject 303 as the specific subject, and adjust the major sound capture region 323 with reference to the specific subject. In addition, the control unit 110 may collect the subject information of the second subject 303 recognized as the specific subject through the subject tracking module 112. The control unit 110 may obtain the movement information of the second subject 303 based on the collected subject information of the second subject 303.

For example, the control unit 110 may continuously collect the subject information of the second subject 303 recognized as the specific subject using the subject tracking module 112. For a certain period of time, the control unit 110 may confirm a change amount of the subject information of the second subject 303, and measure the movement information of the second subject 303 based on the change amount. Accordingly, the control unit 110 may also move the major sound capture region 323 (arrow 340) to correspond to the movement of the second subject 303 (arrow 330) together with the movement of the second subject 303. For example, the control unit 110 may continuously track the second subject 303 and control a directional microphone such that the major sound capture region 323 may also be changed with reference to the second subject 303. Here, controlling the directional microphone indicates that the beam-forming angle of the directional microphone is adjusted to change the major sound capture region 323.

Figure 4:
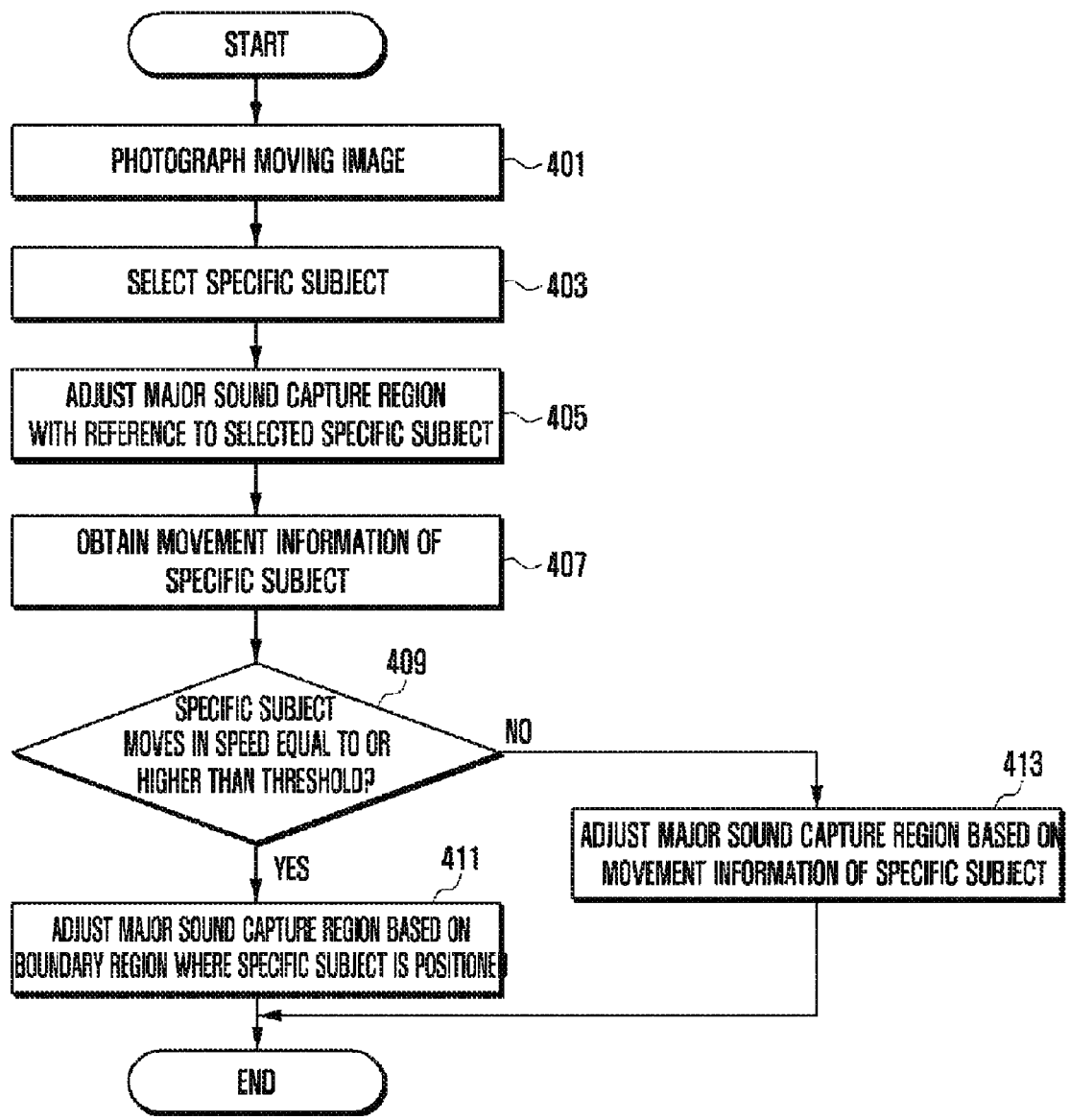
FIG. 4 is a flowchart illustrating a method of adjusting a major sound capture region in a case where a subject moves at a speed equal to or greater than a threshold according to an embodiment of the present disclosure.

FIG. 4 is a flowchart illustrating a method of adjusting a major sound capture region in a case where a subject moves at a speed equal to or greater than a threshold according to an embodiment of the present disclosure.

Referring to FIG. 4, descriptions on operations 401 to 407 are the same as the descriptions of operations 201 to 207 of FIG. 2. Thus, the descriptions on operations 201 to 207 of FIG. 2 will be referred to instead of making the descriptions on operations 401 to 407.

In operation 409, the control unit 110 may measure the moving speed of the specific subject using the speed measuring module 114 based on the movement information of the specific subject. In addition, the control unit 110 may determine whether the specific subject moves in a speed equal to or greater than a threshold. Here, the speed corresponding to the threshold may be the minimum speed of a subject in which the control unit 110 cannot continuously track the specific subject. For example, when the specific subject moves in the speed equal to or greater than the threshold, the control unit 110 cannot track the specific subject any more.

In operation 409, when the specific subject moves in a speed lower than the threshold, the control unit 110 may adjust the major sound capture region based on the movement information of the specific subject in operation 413. Here, the adjustment of the major sound capture region may mean increasing or decreasing the range of the major sound capture region, or changing the position of the major sound capture region. For example, the control unit 110 may confirm the position of the specific subject based on the movement information of the specific subject, and move the major sound capture region to correspond to the confirmed position of the specific subject. In other words, when the specific subject moves in a speed lower than the threshold, the method of adjusting the major sound capture region of the control unit 110 is the same as the method of adjusting the major sound capture region in FIG. 2.

When the specific subject moves in a speed equal to or greater than the threshold in operation 409, the control unit 110 may adjust the major sound capture region based on the boundary region where the specific subject is positioned in operation 411. For example, it may be the state where the major sound capture region has been adjusted by the control unit 110 based on the specific subject. In addition, when the specific subject is moved in a speed equal to or greater than the threshold, the control unit 110 may adjust the major sound capture region based on the boundary region where the specific subject has been positioned. For example, the control unit 110 may re-adjust the major sound capture region that was adjusted based on the specific subject, based on the boundary region where the specific subject is positioned. In addition, although not illustrated, after the major sound capture region is adjusted to correspond to the boundary region, the control unit 110 may determine whether the specific subject moves out of the boundary region. Here, the boundary region is a region that divides the photographing range according to the distance between the specific subject and the electronic device, in which the boundary region may be set in advance through the boundary region setting module 116.

For example, after adjusting the major sound capture region to correspond to the boundary region, the control unit 110 may re-recognize the specific subject. However, in the case where the specific subject is not re-recognized, the control unit 110 may determine that the specific subject moves out of the boundary region. When the specific subject moves out of the boundary region, the control unit 110 may re-adjust the major sound capture region that was adjusted based on the boundary region, based on the photographing range. For example, in operation 411, it is in the state where the control unit 110 has adjusted the sound capture region based on the boundary region. In addition, when the specific subject moves out of the boundary region, the control unit 110 may re-adjust the major sound capture region based on the photographing range, For example, based on the photographing range displayed on the display unit 140. In other words, since the specific subject moves rapidly so that the major sound capture region cannot be adjusted based on the specific subject, the control unit 110 may extend the major sound capture region based on the entire photographing range. Thereafter, the control unit 110 may re-recognize the specific subject. The control unit 110 may re-adjust the major sound capture region that has been extended over the entire photographing range, with reference to the specific subject. If the specific subject does not move out of the boundary region, the control unit 110 may maintain the major sound capture region that has been adjusted to correspond to the boundary region. In addition, the control unit 110 may re-recognize the specific subject and re-adjust the major sound capture region with reference to the specific subject.

Figure 5A:
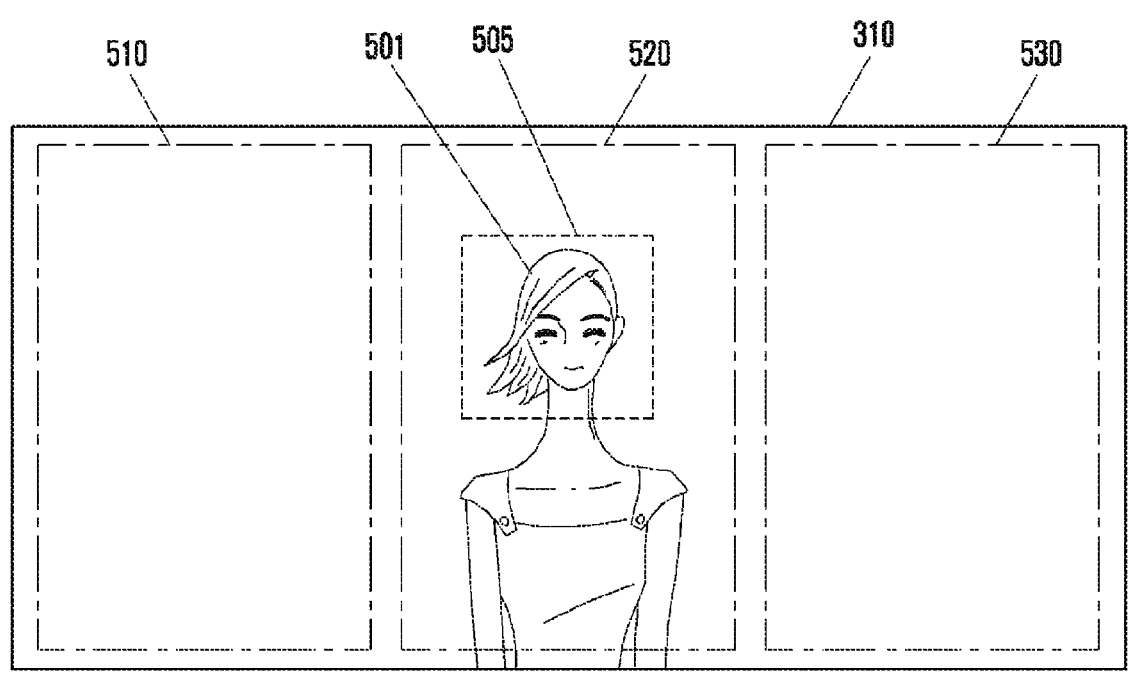
Figure 5C:
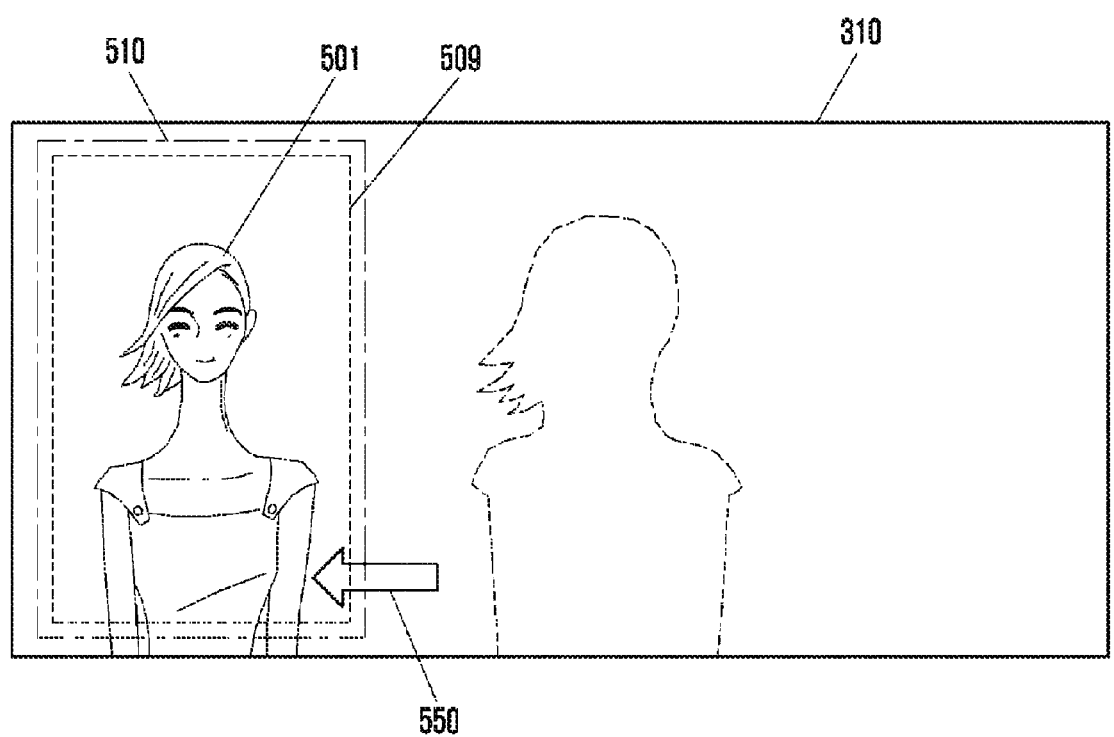

FIGS. 5A, 5B, and 5C are views illustrated based on a method of adjusting a major sound capture region in a case where a subject moves at a speed equal to or greater than a threshold according to an embodiment of the present disclosure.

FIG. 5A may be a view corresponding to operations 401 to 405 in FIG. 4.

Referring to FIG. 5A, the control unit 110 may divide the photographing range 310 into a first boundary region 510, a second boundary region 520, and a third boundary region 530 through the boundary region setting module 116. The control unit 110 may set boundary lines through the boundary region setting module 116, and divide the photographing range 310 into the respective boundary regions with reference to the boundary lines.

Referring to FIG. 5A, the photographing range 310 is divided into three boundary regions, but is not limited thereto. Here, the boundary regions may be set differently based on the distance between the specific subject and the electronic device, and set in advance by a program developer or according to the user setting. The control unit 110 may set in advance the sound capture regions corresponding to the respective boundary regions (the first boundary region 510, the second boundary region 520, and the third boundary region 530) through the sound capture region adjusting module 118. Thereafter, the control unit 110 may store, in the memory 120, information items related to the sound capture regions corresponding to the respective boundary regions. Referring to FIG. 5A, the control unit 110 may be in the state where a specific subject 501 is included in the photographing range 310, and the major sound capture region is adjusted to a first sound capture region 505 with reference to the specific subject 501. The control unit 110 may continuously obtain the movement information of the specific subject 501 through the subject tracking module 112.

FIG. 5B may be a view corresponding to operations 407 to 411 in FIG. 4.

Referring to FIG. 5B, the control unit 110 may be in the state where the major sound capture region is adjusted to the first sound capture region 505. In addition, the specific subject 501 may move in a speed equal to or greater than a threshold (arrow 540). As the specific subject 501 moves in the speed equal to or greater than the threshold (arrow 540), the control unit 110 may not adjust the first sound capture region 505 to correspond to the position of the specific subject 501. Accordingly, when the specific subject 501 moves in the speed equal to or greater than the threshold (arrow 54), the control unit 110 may adjust the major sound capture region from the first sound capture region 505 to a second sound capture region 507 based on the second boundary region 520 where the specific subject 501 is positioned. Although not illustrated, when the specific subject 501 moves in the speed equal to or greater than the threshold (arrow 540), the control unit 110 may adjust the major sound capture region to the first boundary region 510 to correspond to the moving direction of the specific subject 501. Alternatively, when the specific subject 501 moves in the speed equal to or greater than the threshold (arrow 540), the control unit 110 may adjust the major sound capture region to the photographing range 310 regardless of the moving direction of the specific subject 501. Thereafter, the control unit 110 may re-recognize the specific subject 501, and adjust the major sound capture region that has been adjusted to the second sound capture region 507, based on the re-recognized specific subject 501.

FIG. 5C may be another view corresponding to operations 407 to 411 in FIG. 4.

Referring to FIG. 5C, the specific subject 501 may move out of the boundary region in a speed equal to or greater than the threshold (arrow 550). The control unit 110 may determine that the specific subject 501 has moved out of the boundary region in the speed equal to or greater than the threshold (arrow 550) through the subject tracking module 112 and the speed measuring module 114. For example, when the specific subject 501 moves in the speed equal to or greater than the threshold, the control unit 110 may increase the major sound capture region based on the boundary region. Thereafter, the control unit 110 may determine whether the specific subject 501 is included in the boundary region through the subject tracking module 112. At this time, when the specific subject 501 is not included in the boundary region, the control unit 110 may determine that the specific subject 501 has moved out of the boundary region (arrow 550). Although not illustrated, when the specific subject 501 moves out of the boundary region in a speed equal to or greater than the threshold (arrow 550), the control unit 110 may adjust the major sound capture region based on the photographing range 310. For example, the control unit 110 may extend the major sound capture region based on the photographing range 310. Thereafter, the control unit 110 may re-recognize the specific subject 501 so as to confirm the position of the specific subject 501, and re-adjust the major sound capture region to a third sound capture region 509 based on the first boundary region 510 in which the specific subject 501 is positioned. Although not illustrated, the control unit 110 may re-adjust the major sound capture region that has been adjusted to the third sound capture region 509 based on the movement information of the specific subject 501, with reference to the specific subject 501.

Figure 6:
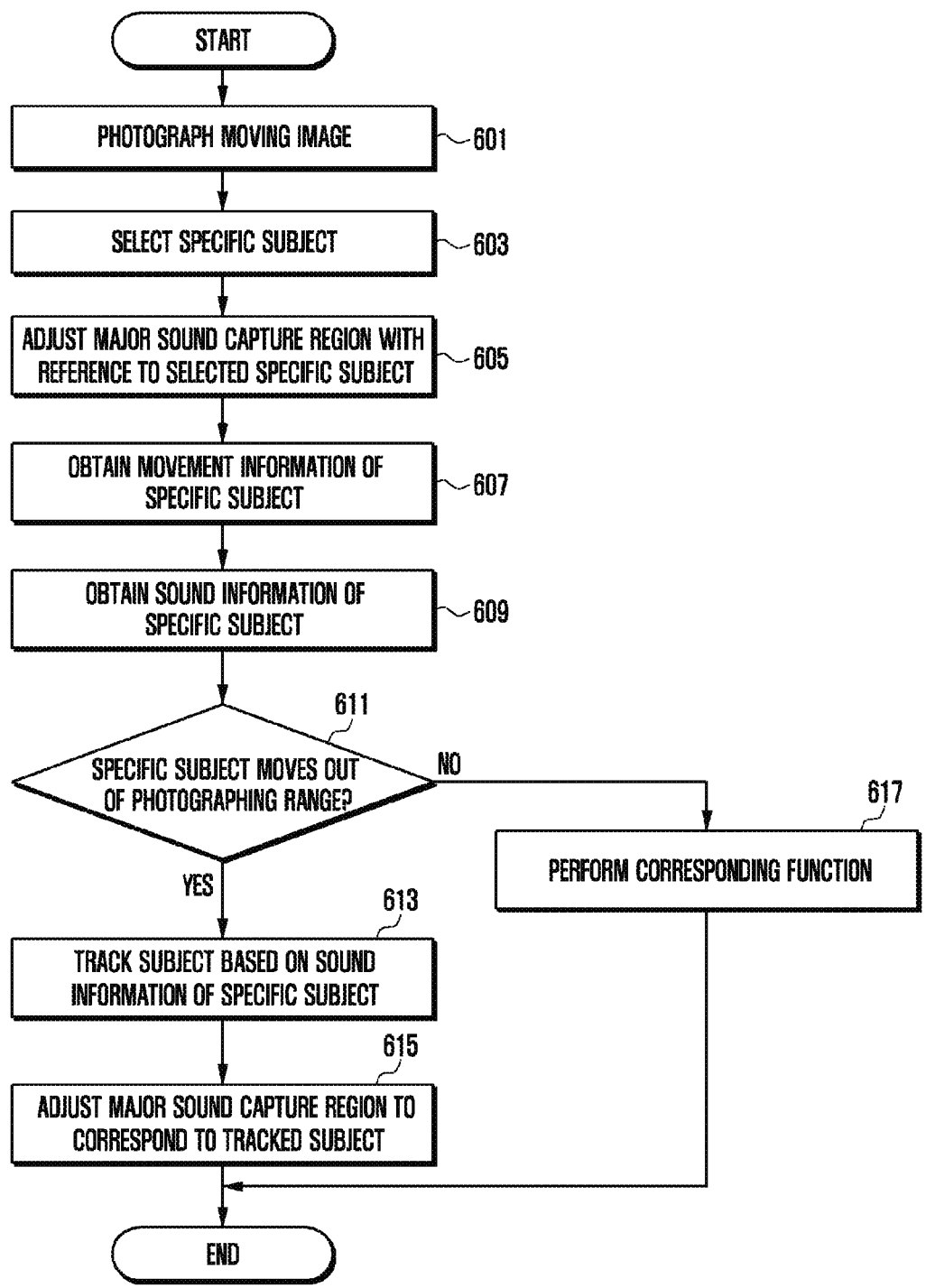
FIG. 6 is a flowchart illustrating a method of adjusting a major sound capture region in a case where a subject moves out of a photographing range according to an embodiment of the present disclosure.

FIG. 6 is a flowchart illustrating a method of adjusting a major sound capture region in a case where a subject moves out of a photographing range according to an embodiment of the present disclosure.

Referring to FIG. 6, descriptions on operations 601 to 607 are the same as the descriptions of operations 201 to 207 of FIG. 2. Thus, the descriptions on operations 201 to 207 of FIG. 2 will be referred to instead of making the descriptions on operations 601 to 607.

In operation 609, the control unit 110 may obtain sound information of a specific subject. The control unit 110 may store the obtained sound information in the memory 120. Here, the sound information may include information items, such as pitch, tune, timbre, frequency, and sound volume. Although not illustrated, in the case where the specific subject is a human, the sound information of the specific subject may be stored in advance in a database. For example, the database may store sound (e.g., voice) information based on the face of the human in advance. For example, the database may store sound information of a human to correspond to the face of the human. In addition, when the face of the human is recognized through the subject tracking module 112, the control unit 110 may invoke the sound information of the recognized human from the database. When the sound information of the human based on the face of the corresponding human is stored in the database, the control unit 110 may select and intensively receive the sounds generated from the specific subject among the sounds simultaneously generated from a plurality of subjects.

After obtaining the sound information of the specific subject in operation 609, the control unit 110 may determine whether the specific subject has moved out of the photographing range in operation 611. When it is determined that specific subject has not moved out of the photographing range in operation 611, the control unit 110 may perform a corresponding function in operation 617. Here, the corresponding function indicates that the control unit 110 adjusts the major sound capture region based on the obtained movement information of the specific subject, similarly to operation 209 of FIG. 2. Since the specific subject does not move out of the photographing range, the control unit 110 may track the specific subject so as to adjust the major sound capture region. The sound capture region may be adjusted based on the movement information of the specific subject. When the specific subject moves out of the photographing range in operation 611, the control unit 110 may track, in operation 613, the specific subject based on the sound information of the specific subject obtained in operation 609. For example, when the specific subject moves out of the photographing range, the specific subject is not displayed on the display unit 140 any more. For example, the control unit 110 cannot track the specific subject through the subject tracking module 112 any more. Accordingly, the control unit 110 may track the position of the specific subject based on the obtained sound information of the specific subject. In operation 615, the control unit 110 may re-adjust the major sound capture region to correspond to the tracked specific subject. For example, even if the specific subject moves out of the photographing range so that the specific subject is not displayed on the display unit 140, the control unit 110 may adjust the major sound capture region based on the sound information of the subject.

Figure 7A:
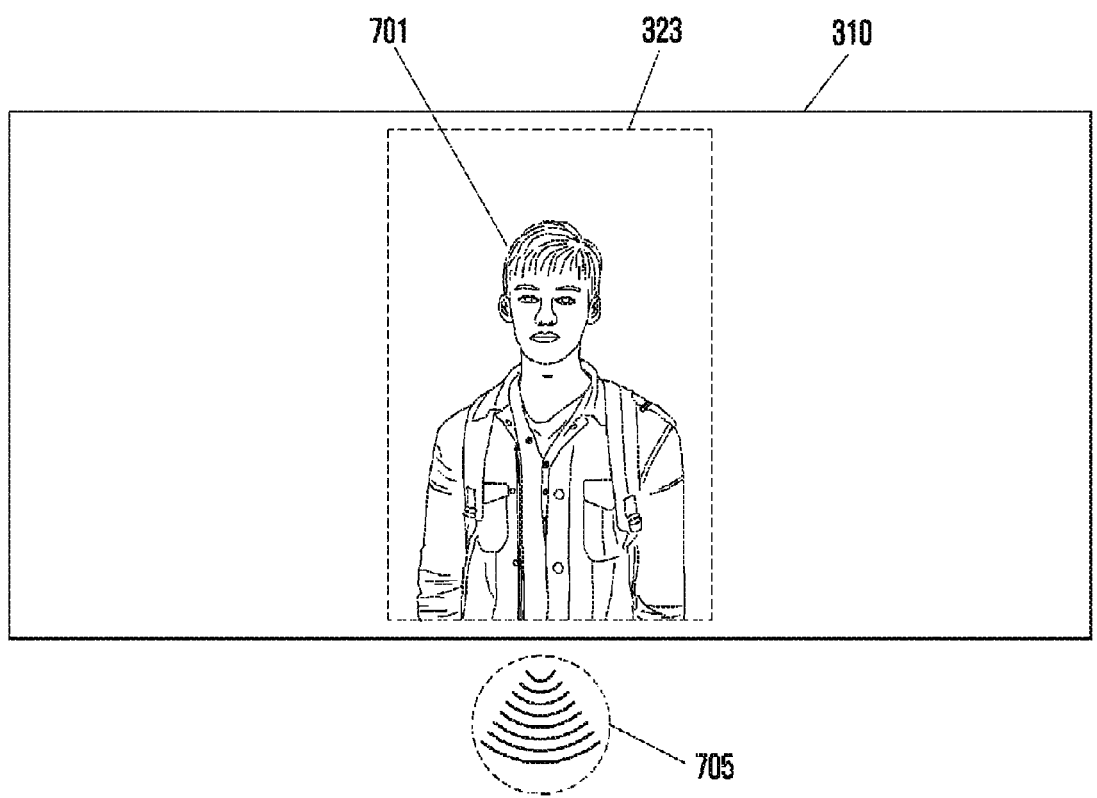

FIGS. 7A and 7B are views illustrated based on a method of adjusting a major sound capture region in a case where a subject moves out of a photographing range according to various embodiments of the present disclosure.

FIG. 7A may be a view corresponding to operations 601 to 609 in FIG. 6.

Referring to FIG. 7A, the control unit 110 may select and recognize a specific subject 701, and adjust the major sound capture region 323 based on the specific subject 701. Thereafter, the control unit 110 may obtain sound information 705 generated from the specific subject 701. Here, the sound information may include, for example, pitch, frequency, and sound volume. In addition, the control unit 110 may store the sound information 705 of the specific subject 701 in the memory 120. Although not illustrated, in the case where the specific subject 701 is a human, the control unit 110 may recognize the face of the corresponding human, and store sound (e.g., voice) information in a database to correspond to the recognized face. When the sound information is stored in advance in the database in connection with the specific subject 701, the control unit 110 may track the specific subject based on the sound information stored in advance in the database and adjust the major sound capture region, even if the sound information 705 of the specific subject 701 is not received in the state where a moving image is being photographed.

FIG. 7B may be a view corresponding to operations 611 to 615 in FIG. 6.

Referring to FIG. 7B, the specific subject 701 may move out of the photographing range 310 (arrow 710). Since the specific subject 701 has moved out of the photographing range 310, the control unit 110 cannot track the specific subject 701 through the subject tracking module 112 any more. For example, when the specific subject 701 is not recognized any more, the control unit 110 may determine that the specific subject 701 has moved out of the photographing range 310. When the specific subject 701 has moved out of the photographing range 310 (arrow 710), the control unit 110 may change the major sound capture region 323 based on the sound information 705 obtained from the specific subject 701. At this time, the major sound capture region 323 may be shifted, with reference to the electronic device 100 to, for example, the left side, right side, upper side, and lower side of the electronic device 100. For example, when the specific subject has moved out of the photographing range 310 to the left side, the control unit 110 may shift the major sound capture region to the left region of the electronic device 100 based on the sound information 705 of the specific subject.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by at least one processor, the at least one processor may perform a function corresponding to the command. The computer-readable storage medium may be, for example, the memory 260. At least some of the programming modules may be implemented (for example, executed) by, for example, the processor. At least a part of the programming module may, for example, include a module, a program, a routine, a set of instructions, or a process for performing at least one function.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of receiving a sound of a subject, the method comprising:
    photographing a moving image;
    selecting at least one subject among subjects included in the photographed moving image;
    obtaining movement information of the selected at least one subject;
    adjusting a major sound capture region based on the obtained movement information of the at least one subject;
    measuring a moving speed of the at least one subject based on the obtained movement information of the at least one subject;
    determining whether the at least one subject, having the moving speed equal to or greater than a threshold, moves out of a boundary region;
    adjusting, when the at least one subject having a moving speed equal to or greater than the threshold moves out of the boundary region, the major sound capture region based on another boundary region; and
    adjusting, when the at least one subject having a moving speed less than the threshold moves within the boundary region, the major sound capture region based on the movement information of the at least one subject.

2. The method of claim 1, further comprising:
re-adjusting the major sound capture region to a pre-set boundary region to correspond to a moving direction of the at least one subject.

3. The method of claim 2, wherein the boundary region is differently set according to a distance between the at least one subject and the electronic device.

4. The method of claim 1, further comprising:
re-adjusting the major sound capture region based on a photographing range.

5. The method of claim 1, wherein the threshold comprises a minimum moving speed of the at least one subject in which the at least one subject cannot be continuously tracked.

6. The method of claim 1, wherein the adjusting of the major sound capture region comprises:
confirming a position of the at least one subject based on the obtained movement information of the at least one subject; and
adjusting the major sound capture region by controlling at least two microphones based on the confirmed position of the at least one subject.

7. The method of claim 6, wherein the microphones are directional microphones, and intensively receive a sound generated from a direction directed by the microphones.

8. The method of claim 1, further comprising:
obtaining sound information of the selected at least one subject;
determining whether the at least one subject moves out of a photographing range; and
adjusting the major sound capture region based on the obtained sound information of the at least one subject when the at least one subject moves out of the photographing range.

9. The method of claim 8, wherein the sound information comprises pitch, tune, timbre, and vibration.

10. At least one non-transitory computer readable storage medium for storing a computer program of instructions configured to be readable by at least one processor for instructing the at least one processor to execute a computer process for performing the method of claim 1.

11. An electronic device for receiving a sound of a subject, the electronic device comprising:
a camera configured to photograph a moving image;
a microphone configured to receive a sound;
a display unit configured to display the moving image photographed by the camera; and
a control unit configured to:
control the camera to photograph the moving image,
select at least one subject included in the photographed moving image,
obtain movement information of the selected at least one subject,
adjust a major sound capture region based on the obtained movement information of the at least one subject,
measure a moving speed of the at least one subject based on the obtained movement information of the at least one subject,
determine whether the at least one subject, having the moving speed equal to or greater than a threshold, moves out of a boundary region,
adjust, when the subject having the moving speed equal to or greater than the threshold moves out of the boundary region, the major sound capture region based on another boundary region, and
adjust, when the at least one subject having a moving speed less than the threshold moves within the boundary region, the major sound capture region based on the movement information of the at least one subject.

12. The electronic device of claim 11,
wherein the control unit is further configured to re-adjust the major sound capture region to a boundary region pre-set to correspond to a moving direction of the at least one subject, and
wherein the boundary region is differently set according to a distance between the at least one subject and the electronic device.

13. The electronic device of claim 11, wherein the control unit is further configured to re-adjust the major sound capture region based on a photographing range.

14. The electronic device of claim 11,
wherein the threshold comprises a minimum moving speed of the at least one subject in which the at least one subject cannot be continuously tracked.

15. The electronic device of claim 11, wherein the control unit is further configured to:
confirm a position of the at least one subject based on the obtained movement information of the at least one subject, and
adjust the major sound capture region by controlling at least two microphones based on the confirmed position of the at least one subject.

16. The electronic device of claim 15, wherein the microphones are directional microphones, and intensively receive a sound generated from a direction directed by the microphones.

17. The electronic device of claim 11, wherein the control unit is further configured to:
obtain sound information of the selected at least one subject, to determine whether the at least one subject moves out of a photographing range, and
adjust the major sound capture region based on the obtained sound information of the at least one subject when the at least one subject moves out of the photographing range,
wherein the sound information comprises pitch, tune, timbre, and vibration.

* * * * *